United States Patent
Khan et al.

(10) Patent No.: US 6,335,847 B1
(45) Date of Patent: Jan. 1, 2002

(54) EXTENDED MOUNT PLATE SUSPENSION FOR SHOCK INSENSITIVITY

(75) Inventors: Amanullah Khan; Alejandro Koji Iwamoto, both of Temecula, CA (US)

(73) Assignee: Nagnecomp Corp., Temecula, CA (US)

( * ) Notice: Subject to any disclaimer, the term of this patent is extended or adjusted under 35 U.S.C. 154(b) by 0 days.

(21) Appl. No.: 09/130,579

(22) Filed: Aug. 6, 1998

Related U.S. Application Data

(63) Continuation-in-part of application No. 08/897,660, filed on Jul. 21, 1997, now Pat. No. 5,901,016.
(60) Provisional application No. 60/055,057, filed on Aug. 8, 1997.

(51) Int. Cl.$^7$ ................................................. G11B 5/48
(52) U.S. Cl. .................................................... 360/244.5
(58) Field of Search .............................. 360/104, 244.5, 360/244.7

(56) References Cited

U.S. PATENT DOCUMENTS 5,901,016 A * 5/1999 Iwamoto ..................... 360/104

* cited by examiner

*Primary Examiner*—A. J. Heinz
(74) *Attorney, Agent, or Firm*—Louis J. Bachand

(57) ABSTRACT

An improved disk drive suspension in which the load beam rail section is of reduced length, the base portion, defined by an extended mounting plate, increased in length, and the spring portion therebetween increased in length. The load beam rail section is laminated with a flexure substantially as wide as the rail section providing a very rigid structure. The centers of gravity of the load beam and flexure are closely approximate such that their reaction moment under shock is small, limiting the $2^{nd}$ bending mode reaction of the load beam in favor of the $1^{st}$ bending mode reaction, so that the slider carried by the load beam and flexure is kept flat to the disk against damaging the disk upon recontact.

5 Claims, 4 Drawing Sheets

EXTENDED MOUNT PLATE SUSPENSION FOR SHOCK INSENSITIVITY

CROSS REFERENCE TO RELATED APPLICATIONS

This application is a continuation in part of the application of Alejandro Koji Iwamoto, Ser. No. 08/897,660 filed Jul. 21, 1997, now U.S. Pat. No. 5,901,016.

This application claims the benefit of U.S. Provisional Application Ser. No. 60/055,057 filed Aug. 8, 1997.

BACKGROUND OF THE INVENTION

1. Technical Field

This invention relates to suspensions for disk drives, and more particularly to suspensions useful in suspension-slider combinations. The invention suspensions are in comparison with previously known suspensions insensitive to shock. The suspensions have a lift-off acceleration characteristic of the suspension which is greatly increased over past suspensions, enabling improved shock performance and reduced likelihood of damage from shock and vibration events experienced by the disk drive. The invention suspension has especial utility with 30%-sized, or pico, sliders.

2. Related Art

Pico sliders having very little mass, and thus low inertia, tend readily to lift from a rest position on the disk surface during shock or vibration events in the disk drive. The preload imposed by the suspension in reaction to the movement of the slider forces the slider back against the disk possibly damaging the disk and/or the slider. The possibility of damage is particularly acute when the slider is carried at an angular, that is other than a flat, orientation to the disk at the instant of re-contact with the disk. An angular orientation of the slider may be encountered with presently known suspensions as a result of undue $2^{nd}$ mode bending of the suspension.

SUMMARY DESCRIPTION OF THE INVENTION

A present challenge in the design of disk drive suspensions is increasing its ability to withstand high shock from the drive and at the same time not to damage the disk surface. The suspension being a cantilever type spring, the lift-off of the suspension depends on mass of the suspension and mass center distance from the rotating axis.

In the design of the present invention there is an extended mounting plate but the load beam length is kept to a total length of about 18 mm. The load beam is laminated by welding a part of the flexure thereto to increase stiffness. The mass center is moved closer to the slider. Hence, the moment developed due to the separation of the mass center and slider is smaller. The force propagated due to this moment through the load beam is smaller in value. This small value creates less traveling force and makes the vibration amplitude less.

Features of the present load beam include:

1. Mass center (e.g.) is close to the slider and the moment developed from two opposite forces (one from reaction force from slider and the other from inertial force) is small.
2. Small traveling force creates less magnitude of excitation force in the beam and less amplitude of vibration.
3. Laminated load beam and flexure welded together in the rail area, combined with a small travelling force tend to excite $1^{st}$ bending mode of the beam, not $2^{nd}$ bending mode. By exciting the lower, $1^{st}$ bending mode, the vibration from the flexure bend-up is decoupled from torsion modes of vibration.
4. Design bias toward the $1^{st}$ bending mode causes the slider to hit the disk flat in comparison to $2^{nd}$ bending mode bend-up of the beam.
5. As the pico slider is very small in size, shortening the load beam flying mass from 0.61 inch to 0.51 inch by having extended mount plate, results in 16% small load beam. The shorter load beam is more stable and its vibration amplitude gain is relatively small.
6. The wide body of the load beam makes the beam laterally stiff and hence improves sway and torsion modes.
7. The invention load beam longer vertical spring area allows more room to form optimized spring (to improve modes of vibrations and lower de-gramming) since stress due to bending is distributed over larger area.

In accordance with the invention, there is provided a substantially shock-insensitive disk drive suspension comprising a longitudinally extended load beam, a mounting plate for mounting the load beam to an actuator, the load beam having a base portion affixed to the mounting plate, a front portion of a predetermined width to which a flexure is attached, and a spring portion between the base portion and the front portion, the base portion being extended and the front portion shortened by the mounting plate having an extension at least 50% more in the load beam longitudinal direction as in the transverse direction, the flexure having substantially the predetermined width of the front portion and being laminated thereto, the load beam and the flexure having their respective centers of gravity spaced a distance 1, the distance 1 having a value minimizing the reaction moment Mr of the load beam when the load beam receives a shock force to thereby reduce the $2^{nd}$ bending moment excitation of the load beam.

In this and like embodiments, typically, the load beam front portion has side rails and comprises between 30 and 40% of the total length of the load beam; the load beam spring portion comprises between 20 and 25% of the total length of the load beam; the load beam base portion mounting plate has a length between 30 and 40% of the total length of the load beam, and the suspension has the following properties:

A $1^{st}$ torsion frequency of about 3.6 Khz

A $2^{nd}$ torsion frequency of about 9.6 Khz

A Sway or lateral bending frequency of about 12.3 Khz

A Lift-off acceleration above about 110 'g'/gm

BRIEF DESCRIPTION OF THE DRAWING

The invention will be further described as to an illustrative embodiment in which.

DETAILED DESCRIPTION

Figure 1:
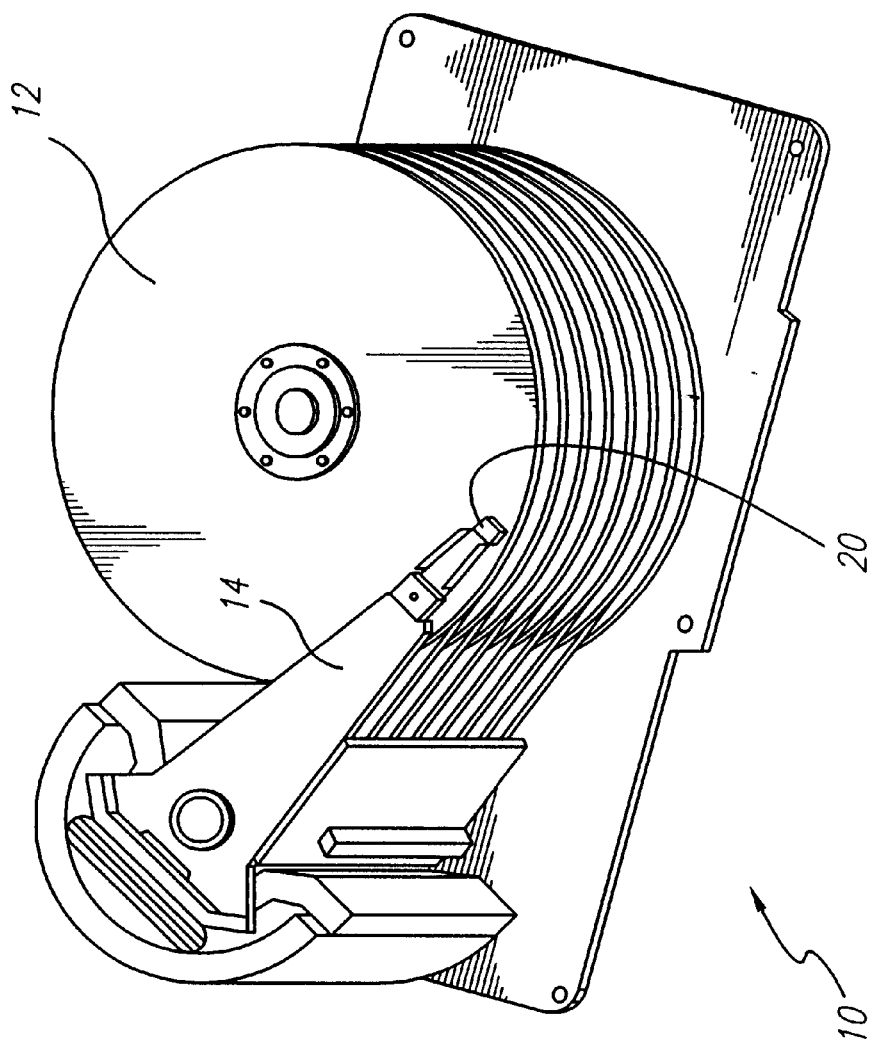
FIG. 1 is an axonometric view of a disk drive stack using the suspension of the present invention.
Figure 2:
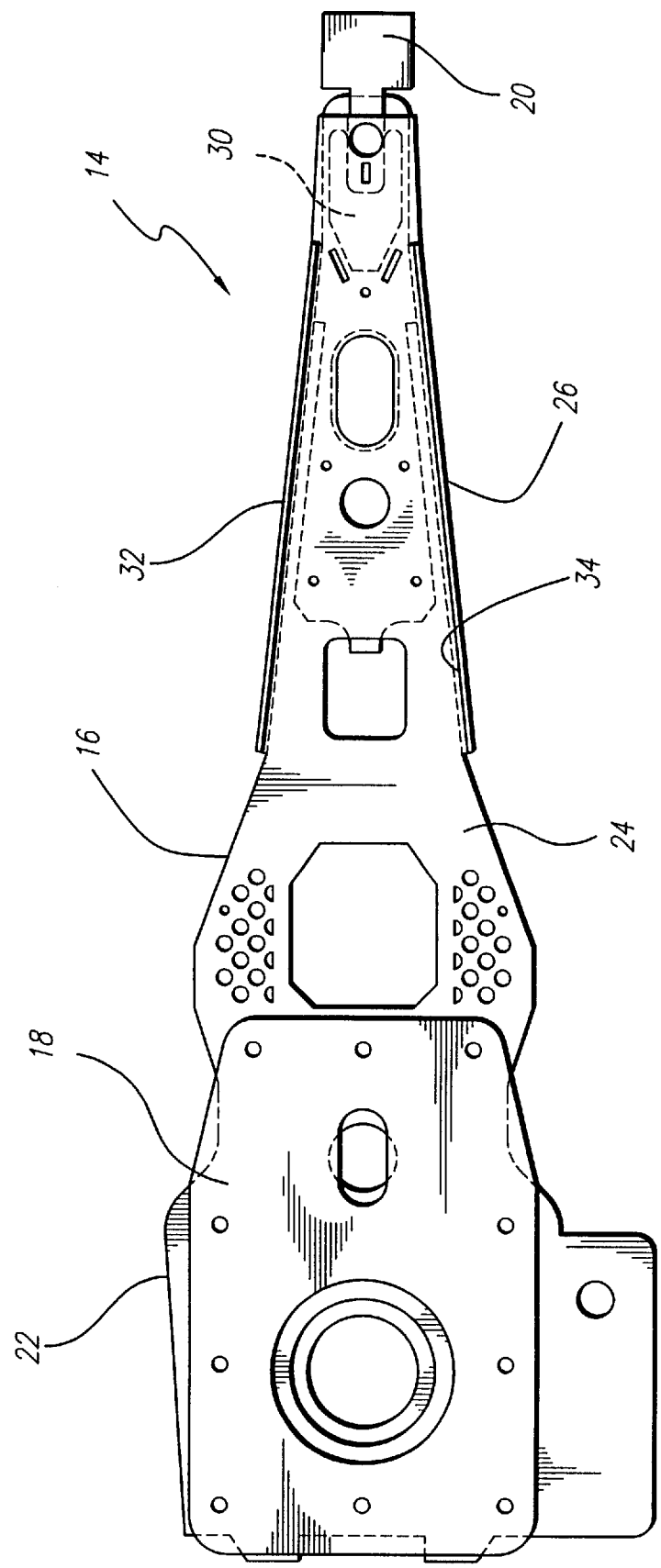
FIG. 2 is a plan view of the invention suspension.

In FIG. 1 a stack 10 is shown comprising a vertically disposed series of disks 12 each having at least one suspension 14. A suspension 14 according to the invention is shown in FIG. 2 to comprise a load beam 16, a mounting plate 18, and a slider 20. The load beam 16 has a base section or portion 22, a spring section or portion 24, and a rail section or front portion or section 26. The base portion 22 is defined in part by mounting plate 18. As shown, the mounting plate 18 is longitudinally extended to be at least 50% longer than it is wide, for purposes of increasing the base portion 22, and thereby decreasing correlatively the beam portion, i.e. rail section 22. Spring section 24 is also atypically long for purpose of decreasing the length of rail section 22 and to afford wider distribution of forces acting in the spring area.

Figure 5:
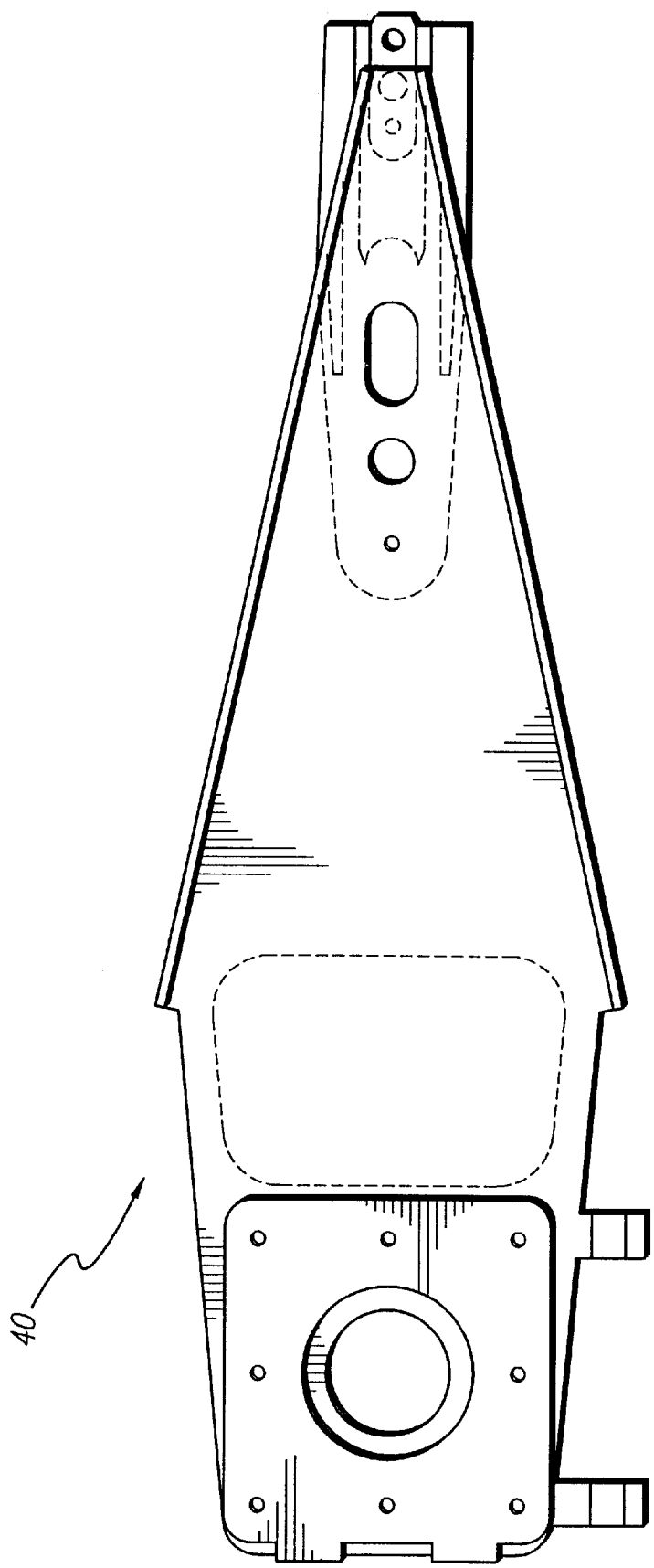

The suspension 14 includes a flexure 30 which is welded or otherwise affixed to the load beam rail section 22. The lamination of these two spring metal members together gives increased rigidity to the rail section 22. The extreme width of the flexure 30, it extends from rail 32 to rail 34 of the rail section 22, enhances the physical properties of the load beam rail section as set forth hereinafter. The proportional sizes of the various sections of the suspension load beam 16 indicated by the arrows are explained in the accompanying Example and following. The invention suspension differs in form and function from the typical prior art suspension shown at 40 in FIG. 5.

Figure 3A:
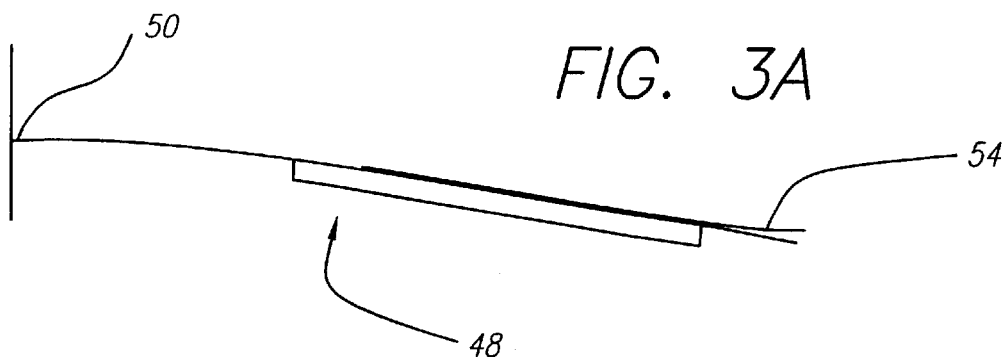
FIG. 3A is a schematic view of a suspension vibrating in the $1^{st}$ bending mode.
Figure 3B:
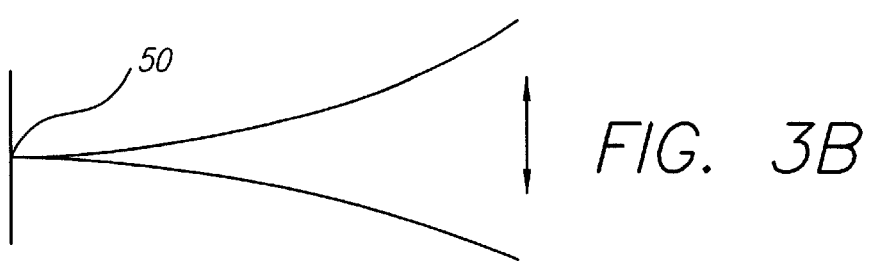
FIG. 3B is a graphical depiction of the motion of the suspension in the $1^{st}$ bending mode.

In FIGS. 3A and 3B the $1^{st}$ bending mode is depicted physically and graphically, respectively. The suspension 48 bends from its locus of cantilever 50 in vibrating response to encountered forces. This mode of bending does not tend to tip the slider 54 from its flat plane parallel to the disk (not shown).

Figure 4A:
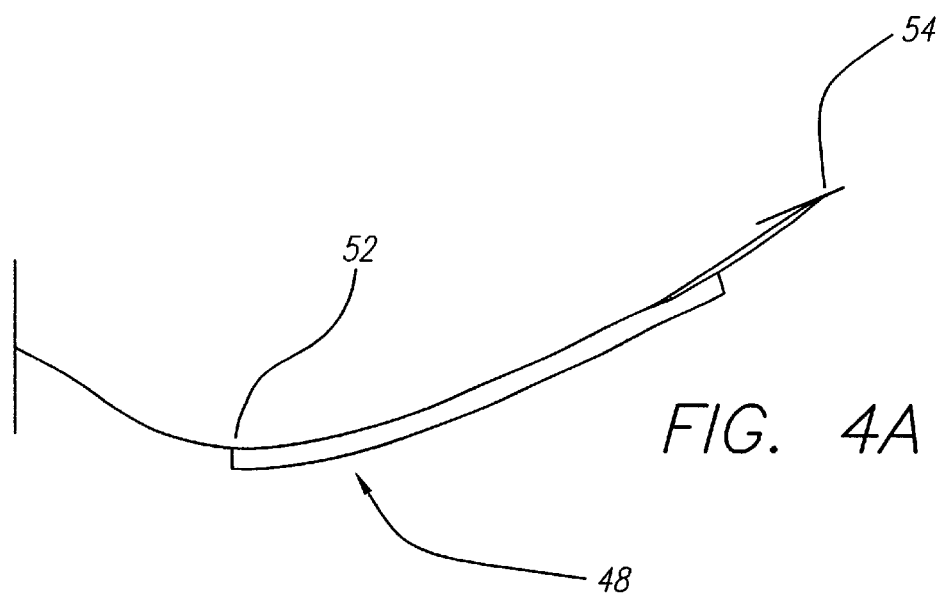
FIG. 4A is a schematic view of a suspension vibrating in the $2^{nd}$ bending mode.
Figure 4B:
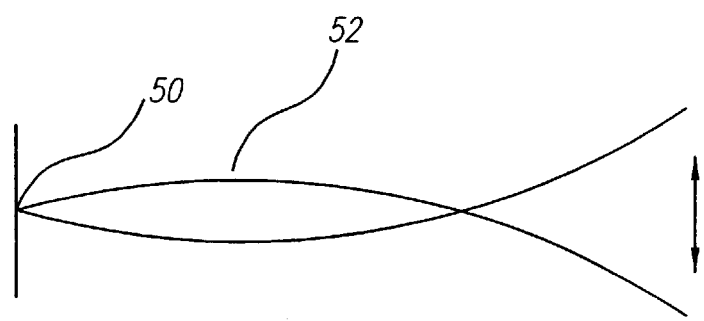
FIG. 4B is a graphical depiction of the motion of the suspension in the $2^{nd}$ bending mode; and, FIG. 5 is a plan view of a prior art suspension normally the same length as the suspension in FIG. 2, shown reduced in size.

In FIGS. 4A and 4B the $2^{nd}$ bending mode is depicted physically and graphically, respectively. The suspension 48 bends not only from its locus of cantilever 50, but also along its length, as at 52. This motion is like a whip being snapped. It has the effect of tipping the slider 54 carried by the suspension at an angle to the disk below or above (not shown) in which position it will recontact the disk, greatly magnifying the force of impact and likely damaging the disk if not the slider.

In pico-size suspension design, a major criterion is the avoidance of shock from sudden movements. Another criterion is minimizing the possibility of damage to the disk resultant from return contact of the slider with the disk. In rigid disk drive suspensions of the cantilevered type, the suspension arm carries the slider at the free end for the purpose of reading and writing signals while held at a predetermined height above the disk. The slider defines an air bearing surface designed to allow the slider to glide above the disk at the predetermined height without actually touching the disk. When the drive is not operating, and the disk is stationary, the slider may repose on the disk. If the disk drive is dropped, jarred or otherwise sharply shocked, the slider will separate from its position of repose on the disk if the shock force overcomes the inertia of the suspension and its slider. Once separated, the slider returns to the disk surface with a reaction force including the force exerted by the spring force of the suspension. Damage to the disk will result from slider recontact if sufficiently forceful, possibly causing loss of magnetic data and loss of impact reliability.

Previously known suspensions, typically those designed for the nano, or 50%, slider size, have on average, a mass of 5 to 5.5 milligrams. Standard size suspensions may have a mass of 110–115 milligrams. The mass of the system and the center point of that mass determine the suspension and slider system inertia. The gram load of the suspension on the slider, or pre-load, as well as the mass of the suspension and slider determine the lift-off or separation value from the disk surface for a given suspension slider system. A typical nano head gimbal assembly (HGA) has slider separation at 40–50 'g'/gm, where 'g' is gravitational acceleration. A 30% size, or pico, HGA has a lower pre-load than a nano HGA and to maintain a like shock characteristic, the mass must be relatively lower than a nano HGA. While a lowering of mass by a change in a physical dimension is possible, such as reducing the thickness of the suspension load beam, this expedient may adversely affect other properties of the suspension.

A further factor, beyond slider separation from the disk, is the relative velocity of the slider when impacting the disk. This factor is exacerbated when the slider is attached to a further spring, e.g. a flexure, which itself vibrates when shocked. This added spring movement imposes additional movement on the slider beyond the suspension movement. Previously known suspensions tend to excite the flexure vibration modes as the load beam vibrates at the frequencies close to the flexure vibration modes. When a cantilever beam, such as a cantilever suspension load beam, vibrates in forced modes of vibration the frequency of that vibration and the location of the applied force are factors to be considered. In a cantilever suspension, like a cantilevered beam, the initial modes of vibration at free state will be $1^{st}$ mode bending and $2^{nd}$ mode bending. $1^{st}$ mode bending is bending from the locus of cantilevered suspension, i.e. at the beam support. In this $1^{st}$ mode the beam free end oscillates in a plane parallel to the beam support locus. $2^{nd}$ mode bending takes place outward from the 1st mode bending locus, along the length of the beam. In $2^{nd}$ mode bending the beam bends on itself between its supported end and its free end in a pattern similar to a whip being cracked. The $2^{nd}$ mode is superimposed on the $1^{st}$ mode movement so that as the cantilevered beam flexes from its locus of support in an up and down motion, the moving beam bends on itself in the course of the up and down motion as a kind of independent ripple along the length of the moving beam. In presently known cantilever type suspensions the $2^{nd}$ bending mode is close to the $1^{st}$ mode. Thus, as previously known as the cantilevered suspension load beams vibrate the depending slider moves up and down with $1^{st}$ mode bending, but with $2^{nd}$ mode bending the slider is whipped from its normal plane flat to the disk into other planes at angles to the disk. Thus disposed at an angle to the disk, the slider may land corner first onto the disk, damaging the disk and possibly the slider as well, the impact being all the greater since concentrated in a smaller area defined by the edge or corner of the slider.

The invention suspension design incorporates a number of shape modifications, materials modifications, and different arrangements of parts so as to obtain preferentially $1^{st}$ mode bending, and to minimize $2^{nd}$ mode bending. In vibration of the invention suspension the slider will land the slider flat on the disk, distributing the force and minimizing the possibility of damage to the disk by the slider.

Among the features of the invention suspension are an effective shortening of the load beam length by attaching an extended mount plate, one extended nearly 50% more axially than transversely, to extend the base portion of the load beam and thus effectively shorten the beam portion of the load beam (the portion of the beam beyond the base portion) since the overall length of the load beam for disk drive purposes remains the same standard length. The shorter effective beam length lowers the suspension mass, improves resonance, beam stability, and the compatibility aspect ratio between the length of the load beam and the slider length.

Other features include increased rigidity of the suspension achieved by using a laminate beam construction, e.g. two thin sheets of stainless steel laminated together to make a very rigid structure. A widened flexure is used as one metal layer, wide enough to substantially match the width of the load beam. The widened flexure is laser welded or otherwise physically integrated with the load beam rail section to increase beam rigidity. Previously known suspensions used narrow flexure, less wide than the load beam in its welded portion, which contributed little to the beam rigidity. In addition, the mass center of the flexure and the mass center of the beam is shifted forward toward the free end of the beam. This design feature minimizes distortion of the load beam as it vibrates. As the invention suspension experiences a shock load, the dynamic forces acting on the load beam are from the mass center of the load beam and the mass center of the flexure. The moment, unwanted, produced by the two forces in the invention suspension is small because the distance between the two forces are small. The traveling force due to shock s accordingly small in magnitude, and less distortion of the load beam occurs with vibration.

The shortened load beam, at 0.051 inch in length, is about 16% shorter than the prior art in length of load beam from the mount plate forward (0.61−0.51/0.61*100) where 0.61 inch is the prior art length of the load beam from the mount plate forward). This shortening of the load beam free length reduces the amplitude of vibration and increase beam stability.

The load beam is also relatively wide and laterally stiff for improved torsion and sway mode vibration properties.

Although generally shorter in free length, the present invention has a longer spring length. The longer spring length distributes the spring area. Distributing the spring area distributes stress build up due to bending. Distribution of stress build-up reduces the gram load loss sometimes resulting from bending the beam backward.

In summary, a typical suspension according to the invention has these properties:
1. Higher Resonance Modes
   a. $1^{st}$ torsion frequency is 3.6 Khz
   b. $2^{nd}$ torsion frequency is 9.6 Khz
   c. Sway or lateral bending is 12.3 Khz
2.
   a. Lift-off acceleration is above 110 'g'/gm
   b. Center of percussion and mass center are closer to slider:
      Lower rotation velocity for a given input energy and mass
      Mass center is close to slider, the forcing function will have a high probability to excite $1^{st}$ bending mode, and a much lower probability to excite flexure bending.
3. Laminated Load Beam and Flexure
   a. Less deflection and stiffer structure.
   b. Less tendency to excite $2^{nd}$ mode of bending, whipping or fly cast effect.
4. Shorter Load Beam
   a. Stable load beam structure, beam length to slider length ratio 10:1 compared to 12.2:1 for standard suspensions.
   b. Less amplification of off-track motions for torsion and sway modes of vibrations due to shorter arm length.
   c. Lower flying mass and inertia.

EXAMPLE

A suspension generally configured as shown in FIG. 2 has the following dimensions:

$$L_1=0.279$$

$$L_2=0.1725$$

$$L_3=0.295$$

$$L_4=0.185\pm0.003$$

Wherein:
$L_1$=Length of mount plate to front welds.
$L_2$=Length of spring section
$L_3$=Length of the load beam with rails.
$L_4$=Length of front welds from mount plate center.
Accordingly:

$$\text{Total length, } L_T=(L_1+L_2+L_3=0.279+0.1725+0.295)=0.7465 \text{ inch}$$

Ratio of mount plate length to total length:

$$L_1/L_T=0.279/0.7465=0.374 \text{ or } 37.4\% \text{ of the total suspension length.}$$

This ratio can range from 30 to 40%, ±10–15%, adjusting other ratios as necessary, providing the benefits of the invention are retained.

Ratio of spring section length to total length:

$$L_2/L_T=0.1725/0.7465=0.231 \text{ or } 23.1\% \text{ of the total suspension.}$$

This ratio can range from 20 to 25%, ±10–15%, adjusting other ratios as necessary, provided the benefit of strength distribution over a larger length than in a typical suspension is retained. A ratio of 20–25% allows less plastic deformation. Gram-load loss attributable to backbending is thus reduced.

Ratio of rail section length to total length:

$$L_3/L_T=0.295/0.7465=0.3952 \text{ or } 39.52\% \text{ of the total suspension length.}$$

This ratio can range from 30 to 45%, ±10–15%, adjusting other ratios as necessary, provided the advantage of an overall shortening of the beam front of rail section is preserved.

Ratio of length from mounting plate center (swaging hole center) to front welds to mounting plate length:

$$L_4/L_1=0.185/0.279=0.663 \text{ or } 66.3\%$$

This ratio of mounting plate center-to-front weld length to total plate length can range from 60 to 70% ±10–15%, adjusting other ratios as necessary, provided the benefits of the invention are retained.

Ratio of rail section plus mounting plate to total plate length:

$$(L_1+L_3)/L_T=(0.279+0.295)/0.7465=0.7689 \text{ or } 76.9\%$$

This ratio can range from 70 to 80%, ±10–15%, adjusting other ratios as necessary, provided the benefits of the invention are retained.

Ratio of spring section length to rail section length plus mounting plate length:

$$L_2/(L_1+L_3)=0.1725/(0.279+0.295)=0.3005 \text{ or } 30.05\%$$

This ratio can range from 25 to 35%, ±10–15%, adjusting other ratios as necessary, provided the benefits of the invention are retained.

We claim:

1. A shock-insensitive disk drive suspension comprising a longitudinally extended load beam having a free end, a longitudinal extent and a transverse extent normal to said longitudinal extent, a mounting plate for mounting said load bean to an actuator, said load beam having a base portion affixed to said mounting plate, a spring portion and therebeyond a front portion of a predetermined width to which a flexure is attached, the length of said base portion as a proportion of said load beam being relatively extended and the length of said front portion as a proportion of said load beam being relatively shortened by said mounting plate having an extension at least 50% more in the load beam longitudinal direction than in the transverse direction, said flexure having substantially the width of said front portion and being laminated thereto, said load beam shortening shifting forward the load beam and flexure respective centers of gravity and spacing said centers of gravity a shorter distance apart, whereby the reaction moment Mr of the load beam when the load beam receives a shock force is minimized and thereby the $2^{nd}$ bending moment excitation of the load beam is reduced.

2. The shock insensitive disk drive suspension according to claim 1, in which said load beam front portion has side rails and comprises between 30 and 40% of the total length of said load beam.

3. The shock insensitive disk drive suspension according to claim 1, in which said load beam spring portion comprises between 20 and 25% of the total length of said load beam.

4. The shock insensitive disk drive suspension according to claim 1, in which said load beam base portion mounting plate has a length between 30 and 40% of the total length of said load beam.

5. The shock insensitive disk drive suspension according to claim 1, in which the suspension has the following properties:

A $1^{st}$ torsion frequency of about 3.6 Khz

A $2^{nd}$ torsion frequency of about 9.6 Khz

A Sway or lateral bending frequency of about 12.3 Khz

A Lift-off acceleration above about 110 'g'/gm.

* * * * *

UNITED STATES PATENT AND TRADEMARK OFFICE
CERTIFICATE OF CORRECTION

PATENT NO. : 6,335,847 B1  
DATED : January 1, 2002  
INVENTOR(S) : Amanullah Khan and Alenjandro Koji It is certified that error appears in the above-identified patent and that said Letters Patent is hereby corrected as shown below:

<u>Title page,</u>  
Item [73], should read -- Assignee: Magnecomp Corp., Temecula, CA (US) --

Signed and Sealed this

Twenty-seventh Day of August, 2002

Attest:

JAMES E. ROGAN  
Attesting Officer     Director of the United States Patent and Trademark Office